(12) United States Patent
Akbarpour et al.

(10) Patent No.: US 11,308,544 B2
(45) Date of Patent: Apr. 19, 2022

(54) SYSTEM AND METHOD TO GENERATE SHOPPABLE CONTENT AND INCREASE ADVERTISING REVENUE IN SOCIAL NETWORKING USING CONTEXTUAL ADVERTISING

(71) Applicant: MONJERI INVESTMENTS, LLC, Atherton, CA (US)

(72) Inventors: Susan Akbarpour, Atherton, CA (US); Panagiotis Papadimitriou, Mountain View, CA (US)

( * ) Notice: Subject to any disclaimer, the term of this patent is extended or adjusted under 35 U.S.C. 154(b) by 0 days.

(21) Appl. No.: 14/865,106

(22) Filed: Sep. 25, 2015

(65) Prior Publication Data

US 2016/0092967 A1     Mar. 31, 2016

Related U.S. Application Data (60) Provisional application No. 62/056,191, filed on Sep. 26, 2014.

(51) Int. Cl.
     *G06Q 30/06*     (2012.01)
     *G06Q 50/00*     (2012.01)

(52) U.S. Cl.
     CPC ..... *G06Q 30/0633* (2013.01); *G06Q 30/0631* (2013.01); *G06Q 50/01* (2013.01)

(58) Field of Classification Search
     CPC ......... G06Q 30/06–0645; G06Q 30/02; G06Q 30/0206; G06Q 30/0633; G06Q 30/0631; G06Q 50/01

(Continued)

(56) References Cited

U.S. PATENT DOCUMENTS 6,230,143 B1    5/2001    Simons et al.
6,850,917 B1    2/2005    Hom et al.

(Continued)

FOREIGN PATENT DOCUMENTS

WO     WO2016/049632 A1     3/2016

OTHER PUBLICATIONS

Farr, Christina. New Instacart feature lets friends and colleagues share a shopping cart. VentureBeat. Mar. 12, 2013. Accessed via https://venturebeat.com/2013/03/12/new-instacart-feature-lets-friends-and-colleagues-share-a-shopping-cart-exclusive/ (Year: 2013).*

(Continued)

*Primary Examiner* — Allison G Wood
(74) *Attorney, Agent, or Firm* — Alexander Chen, Esq.

(57) ABSTRACT

Methods and systems for increasing potential advertising revenue by incorporating shopping cart links into social media posts. The method may include receiving an input indicating a user request to add a shopping cart link to a social networking post associated with a user making the user request, the social networking post to be posted to one or more social networks, determining a cost for placing the shopping cart link in the social networking post, providing the determined cost to the user, receiving confirmation from the user to add the shopping cart link to the social networking post, and adding the shopping cart link to the social networking post. Any costs paid by the user to post the shopping cart link may be recovered from commissions or other similar payments received for each user that browses or purchases an item in the shopping cart link.

2 Claims, 8 Drawing Sheets

(58) Field of Classification Search
USPC .................. 705/26.1–27.2, 26.8, 26.7, 319
See application file for complete search history.

(56) References Cited

U.S. PATENT DOCUMENTS

| | | |
|---|---|---|
| 6,885,997 B1 | 4/2005 | Roberts |
| 7,043,457 B1 | 5/2006 | Hansen |
| 7,127,414 B1 | 10/2006 | Awadallah et al. |
| 7,155,402 B1 | 12/2006 | Dvorak |
| 7,356,490 B1 | 4/2008 | Jacobi et al. |
| 7,617,111 B1 | 11/2009 | Sheppard et al. |
| 7,702,534 B1 | 4/2010 | Shimizu |
| 7,720,722 B2 | 5/2010 | Ho et al. |
| 7,729,988 B1 | 6/2010 | Walker et al. |
| 7,831,476 B2 | 11/2010 | Foster et al. |
| 7,945,482 B2 | 5/2011 | Law et al. |
| 8,108,268 B1 | 1/2012 | Andrews |
| 8,234,183 B2 | 7/2012 | Smith |
| 8,255,291 B1 | 8/2012 | Nair |
| 8,301,513 B1 | 10/2012 | Peng et al. |
| 8,326,700 B1 | 12/2012 | Laufer et al. |
| 8,407,104 B2 | 3/2013 | Lu |
| 8,417,586 B2 | 4/2013 | Tischer |
| 8,452,669 B2 | 5/2013 | Wolfe et al. |
| 8,533,039 B1 | 9/2013 | Winslade et al. |
| 8,660,912 B1 | 2/2014 | Dandekar |
| 8,682,740 B2 | 3/2014 | Battle et al. |
| 8,751,272 B2 | 6/2014 | Seybold et al. |
| 8,825,888 B2 | 9/2014 | Schoen et al. |
| 9,123,079 B2 | 9/2015 | Zigoris et al. |
| 2002/0178072 A1 | 11/2002 | Gusler et al. |
| 2003/0004831 A1 | 1/2003 | Owens |
| 2003/0023507 A1 | 1/2003 | Jankelewitz |
| 2003/0233425 A1 | 12/2003 | Lyons et al. |
| 2003/0236712 A1 | 12/2003 | Antonucci et al. |
| 2005/0033656 A1 | 2/2005 | Wang et al. |
| 2005/0091122 A1 | 4/2005 | Kiefer et al. |
| 2005/0144074 A1 | 6/2005 | Fredregill et al. |
| 2005/0209921 A1 | 9/2005 | Roberts et al. |
| 2006/0085259 A1 | 4/2006 | Nicholas et al. |
| 2006/0122895 A1 | 6/2006 | Abraham et al. |
| 2006/0161480 A1 | 7/2006 | Christenson |
| 2007/0033114 A1 | 2/2007 | Minor |
| 2007/0073591 A1 | 3/2007 | Perry et al. |
| 2007/0112635 A1 | 5/2007 | Loncaric |
| 2007/0150369 A1 | 6/2007 | Zivin |
| 2007/0162355 A1 | 7/2007 | Tabin |
| 2007/0168216 A1 | 7/2007 | Lemelson |
| 2007/0226052 A1 | 9/2007 | Abbott |
| 2007/0271136 A1* | 11/2007 | Strauss .................. G06Q 30/02 705/14.61 |
| 2008/0071640 A1 | 3/2008 | Nguyen |
| 2008/0091546 A1 | 4/2008 | Kirovski et al. |
| 2008/0147483 A1 | 6/2008 | Ji |
| 2008/0189189 A1 | 8/2008 | Morgenstern |
| 2008/0255967 A1 | 10/2008 | Shi |
| 2009/0043665 A1 | 2/2009 | Tirumalareddy et al. |
| 2009/0055285 A1 | 2/2009 | Law et al. |
| 2009/0055291 A1 | 2/2009 | Ho et al. |
| 2009/0055292 A1 | 2/2009 | Chong et al. |
| 2009/0063299 A1 | 3/2009 | Amacker |
| 2009/0064009 A1 | 3/2009 | Krantz et al. |
| 2009/0106085 A1 | 4/2009 | Raimbeault |
| 2009/0117695 A1 | 7/2009 | Mahajan et al. |
| 2009/0292618 A1 | 11/2009 | Chatila |
| 2010/0042511 A1 | 2/2010 | Sundaresan et al. |
| 2010/0070343 A1 | 3/2010 | Taira et al. |
| 2010/0088158 A1 | 4/2010 | Pollack |
| 2010/0094729 A1 | 4/2010 | Gray et al. |
| 2010/0153235 A1 | 6/2010 | Mohr et al. |
| 2010/0205066 A1 | 8/2010 | Ho et al. |
| 2010/0257020 A1 | 10/2010 | Bryant et al. |
| 2010/0312669 A1 | 12/2010 | Hanus et al. |
| 2010/0324982 A1 | 12/2010 | Maroili |
| 2010/0324990 A1* | 12/2010 | D'Angelo .............. G06Q 10/10 705/14.46 |
| 2010/0332283 A1 | 12/2010 | Ng et al. |
| 2011/0029363 A1 | 2/2011 | Gillenson et al. |
| 2011/0040655 A1 | 2/2011 | Hendrickson |
| 2011/0093361 A1 | 4/2011 | Morales |
| 2011/0145105 A1 | 6/2011 | Law et al. |
| 2011/0161194 A1 | 6/2011 | Dumke et al. |
| 2011/0178889 A1 | 7/2011 | Abraham et al. |
| 2011/0184780 A1 | 7/2011 | Alderson et al. |
| 2011/0238484 A1 | 9/2011 | Toumayan et al. |
| 2011/0264556 A1 | 10/2011 | Ho et al. |
| 2011/0264557 A1 | 10/2011 | Ho et al. |
| 2012/0029998 A1 | 2/2012 | Aversano et al. |
| 2012/0072304 A1 | 3/2012 | Homan |
| 2012/0078731 A1* | 3/2012 | Linevsky ........... G06Q 30/0277 705/14.73 |
| 2012/0116897 A1* | 5/2012 | Klinger .............. G06Q 30/0277 705/14.73 |
| 2012/0123673 A1 | 5/2012 | Perks et al. |
| 2012/0123674 A1 | 5/2012 | Perks et al. |
| 2012/0123837 A1 | 5/2012 | Wiesner |
| 2012/0130858 A1 | 5/2012 | Kiss et al. |
| 2012/0150598 A1* | 6/2012 | Griggs .................... G06Q 30/06 705/14.16 |
| 2012/0185355 A1 | 7/2012 | Kilroy |
| 2012/0197700 A1 | 8/2012 | Kalin |
| 2012/0197754 A1 | 8/2012 | Kalin |
| 2012/0203661 A1 | 8/2012 | Baharloo et al. |
| 2012/0239535 A1 | 9/2012 | Leal |
| 2012/0246029 A1 | 9/2012 | Ventrone |
| 2012/0253972 A1 | 10/2012 | Oskolkov et al. |
| 2012/0284085 A1 | 11/2012 | Walker et al. |
| 2013/0006916 A1 | 1/2013 | McBride et al. |
| 2013/0041781 A1 | 2/2013 | Freydberg |
| 2013/0066714 A1* | 3/2013 | Umeda .................. G06Q 50/01 705/14.46 |
| 2013/0117378 A1 | 5/2013 | Kotorov et al. |
| 2013/0132240 A1 | 5/2013 | Aguilar |
| 2013/0138477 A1 | 5/2013 | Wilkins et al. |
| 2013/0173431 A1 | 7/2013 | Nations et al. |
| 2013/0179948 A1 | 7/2013 | Ho et al. |
| 2013/0204749 A1 | 8/2013 | De Almeida Machado et al. |
| 2013/0211953 A1 | 8/2013 | Abraham et al. |
| 2013/0211965 A1 | 8/2013 | Simkin et al. |
| 2013/0215116 A1 | 8/2013 | Siddique et al. |
| 2013/0218703 A1 | 8/2013 | Jakobson |
| 2013/0218949 A1 | 8/2013 | Jakobson |
| 2013/0226732 A1 | 8/2013 | Law et al. |
| 2013/0246186 A1 | 9/2013 | Chang et al. |
| 2013/0268331 A1 | 10/2013 | Bitz et al. |
| 2013/0290145 A1 | 10/2013 | Durst, Jr. |
| 2013/0290149 A1 | 10/2013 | Rashawn |
| 2013/0311335 A1 | 11/2013 | Howard et al. |
| 2013/0325667 A1 | 12/2013 | Satyavolu et al. |
| 2013/0339113 A1 | 12/2013 | Junger |
| 2013/0339159 A1 | 12/2013 | Shaikh et al. |
| 2013/0339198 A1 | 12/2013 | Gray et al. |
| 2013/0339452 A1 | 12/2013 | Shaikh et al. |
| 2013/0346172 A1* | 12/2013 | Wu ..................... G06Q 30/0251 705/14.16 |
| 2014/0025531 A1 | 1/2014 | Nachiappan |
| 2014/0032366 A1 | 1/2014 | Spitz et al. |
| 2014/0039911 A1 | 2/2014 | Iyer |
| 2014/0040074 A1 | 2/2014 | Anspach et al. |
| 2014/0047355 A1 | 2/2014 | Yerli |
| 2014/0067615 A1 | 3/2014 | Park et al. |
| 2014/0089082 A1* | 3/2014 | Lee ..................... G06Q 30/0275 705/14.45 |
| 2014/0114674 A1 | 4/2014 | Krughoff et al. |
| 2014/0122203 A1* | 5/2014 | Johnson ................ G06Q 30/02 705/14.23 |
| 2014/0136278 A1 | 5/2014 | Carvalho |
| 2014/0195370 A1* | 7/2014 | Devasia ............. G06Q 30/0633 705/26.7 |
| 2014/0214518 A1 | 7/2014 | Hatch et al. |
| 2014/0222475 A1 | 8/2014 | Orkin |
| 2014/0258044 A1 | 9/2014 | Chrzan |
| 2014/0278903 A1 | 9/2014 | Wang et al. |
| 2014/0279266 A1 | 9/2014 | Lampert |

(56) References Cited

U.S. PATENT DOCUMENTS

| | | |
|---|---|---|
| 2015/0026015 A1 | 1/2015 | Fishman et al. |
| 2015/0039468 A1 | 2/2015 | Spitz et al. |
| 2015/0178808 A1 | 6/2015 | Grossman et al. |
| 2015/0193851 A1 | 7/2015 | Hua et al. |
| 2015/0332310 A1* | 11/2015 | Cui .................... G06Q 30/0244 705/14.45 |
| 2016/0019636 A1 | 1/2016 | Adapalli et al. |

OTHER PUBLICATIONS

How to comparison shop in Mavatar, youtube webpages, Mavatar channel, Jun. 4, 2013 https://www.youtube.com/watch7v-fs6Wt8q7gJg.
International Search Report dated Jan. 7, 2016 for International Application No. PCT/US2015/052658.
What is Mavatar, Mavatar channel, yhoutube webpages, Published Dec. 28, 2012 https://www.youtube.com/watch 7v=A7nGW8ovO_Q.

* cited by examiner

SYSTEM AND METHOD TO GENERATE SHOPPABLE CONTENT AND INCREASE ADVERTISING REVENUE IN SOCIAL NETWORKING USING CONTEXTUAL ADVERTISING

CROSS-REFERENCE TO RELATED APPLICATION

This application claims benefit of and priority to U.S. Provisional Application No. 62/056,191 entitled "Systems and Methods to Generate Shoppable Content and Increase Advertising Revenue in Social Networking Using Contextual Advertising," filed Sep. 26, 2014, the disclosure of which is incorporated by reference herein in its entirety.

BACKGROUND

Social networking has provided a medium for advertisers to reach a large number of users while also tailoring the advertising to particular groups of interested users. For example, a social networking site may provide a platform for a group of users having a particular interest to congregate and further provide advertising space relating to that particular interest at the platform or individually to each of the users in the group.

However, current advertising methods do not have a sufficient means for allowing users to purchase advertised items. Currently, to purchase an item that is provided for sale in an advertisement, a user may click on a link that is embedded in the advertising and/or social networking post to be directed to a separate webpage or website to complete the sales transaction. Certain providers may balk at the notion of providing one or more links to products in the advertisements because such links may drive a consumer away from the social network with a high likelihood that the consumer will not return to the provider's content after clicking the link. Such click-through advertising may be disadvantageous for a plurality of reasons, such as, for example, diminished advertising or click-through revenue.

In addition, present social network advertising only provides advertising space in areas surrounding content. For example, advertising space may be located off to the side of a webpage, between posts, at the bottom of a webpage, and/or the like. Such advertising may be easier for a user to ignore because it is not directly in line with the content. Furthermore, no current method exists for appending advertising to previously posted content, particularly content that was posted before the advertising was posted and/or was available.

Present social network advertising also only allows advertisers to reach their users by specifying particular user characteristics. For example, the advertiser may specify a gender, an age range, an income range, particular interests and/or the like of the user. Advertisers are unable to specify the context in which the advertising will appear (for example, a picture, a video, and/or the like). Thus, while the advertising may appeal to a particular user based on the user characteristics, it may not be related to the content displayed by the social network. Accordingly, the advertising may not reach a user who is viewing content outside of his/her known characteristics.

Additionally, current methods of advertising on social networking sites require the advertisers themselves to create and/or select the content to be advertised. Creating, testing, and choosing the best advertising may be costly and time consuming. In addition, such methods may not allow for advertisers to identify topics of interest (i.e., which topics are trending), select the latest product trends, which may be influenced by the social network. Thus, the latest and greatest celebrity style, runway trends, and shopping suggestions from the fashion and beauty experts, movies, television shows, shorts, and/or the like that may have already grabbed an audience's attention are not accurately reflected in advertising or efficiently utilized at the instant the styles, trends, and suggestions are available. Accordingly, the advertisements may be inaccurate and/or out-of-date.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "user" refers to one or more entities or people using any of the components and/or elements thereof as described herein. In some embodiments, the user may be a user of an electronic device. In other embodiments, the user may be a user of a computing device. Users described herein are generally either creators of content, managers of content, merchants, or consumers. For example, a user can be an administrator, a developer, a group of individuals, a content provider, a consumer, a merchant, a representative of another entity described herein, and/or the like.

An "electronic device" refers to a device that includes a processor and a tangible, computer-readable memory or storage device. The memory may contain programming instructions that, when executed by the processing device, cause the device to perform one or more operations according to the programming instructions. Examples of electronic devices include personal computers, supercomputers, gaming systems, televisions, mobile devices, medical devices, recording devices, and/or the like.

A "mobile device" refers to an electronic device that is generally portable in size and nature or is capable of being operated while in transport. Accordingly, a user may transport a mobile device with relative ease. Examples of mobile devices include pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches, and the like.

A "computing device" is an electronic device, such as a computer, a processor, a memory, and/or any other component, device or system that performs one or more operations according to one or more programming instructions.

A "user interface" is an interface which allows a user to interact with a computer or computer system. A user interface may generally provide information or data to the user and/or receive information or data from the user. The user interface may enable input from a user to be received by the computer and may provide output to the user from the computer. Accordingly, the user interface may allow a user to control or manipulate a computer and may allow the computer to indicate the effects of the user's control or manipulation. The display of data or information on a display or a graphical user interface is a non-limiting example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are non-limiting examples of user interface components which enable the receiving of information or data from a user.

An "item", a "product", or "merchandise" are all goods and/or services that may be available for purchase. For example, the item, product, or merchandise may be an article of clothing, a fashion accessory, a household good, an electronic device, a car, an airline ticket, a hotel reservation, an event ticket, an insurance policy, property, repair services, and/or any other good or service. Items, products, and merchandise are generally used interchangeably herein, and therefore a discussion of one or more of the terms is meant to include any or all of the terms.

The present disclosure relates generally to systems and methods that monetize current and previous posts to a social networking platform by providing users with an ability to place a shopping cart link in a post, where the link gives others an opportunity to make content within the post shoppable and/or purchase one or more items related to the post by clicking on the shopping cart link. Use of such systems and methods allows for a plurality of entities to generate revenue. For example, a content provider and/or a social networking provider may generate revenue by charging users for the ability to use future, current, and previous posts for the shopping cart link. Moreover, a unified shopping cart provider or merchant may generate revenue by providing a user with a direct link and/or an interface to purchase one or more products directly from the social networking platform without navigating to another website. Furthermore, users placing the shopping cart link in a post may generate revenue in the form of advertising referrals for directing users of the social networking platform to a merchant or a unified shopping cart provider. Persons having ordinary skill in the art may recognize other revenue generation streams without departing from the scope of the present disclosure.

The systems and methods described herein, in addition to generating income for a social networking platform provider and/or a unified shopping cart provider, may offer a social networking user a straight-forward, non-obtrusive mechanism for making single- and multi-item online shopping easy and painless, particularly for items suggested in a social networking post. Furthermore, the user may be assured that all promotions to which the user is entitled have been automatically considered. In addition, the systems and methods described herein may allow for a user to discover products he/she would not have considered or been aware of by empowering other social networking users to publish content-containing links to the products and/or collections of products within future (i.e., automatically adding links when a future post is created), current, or previous social networking posts.

Figure 1:
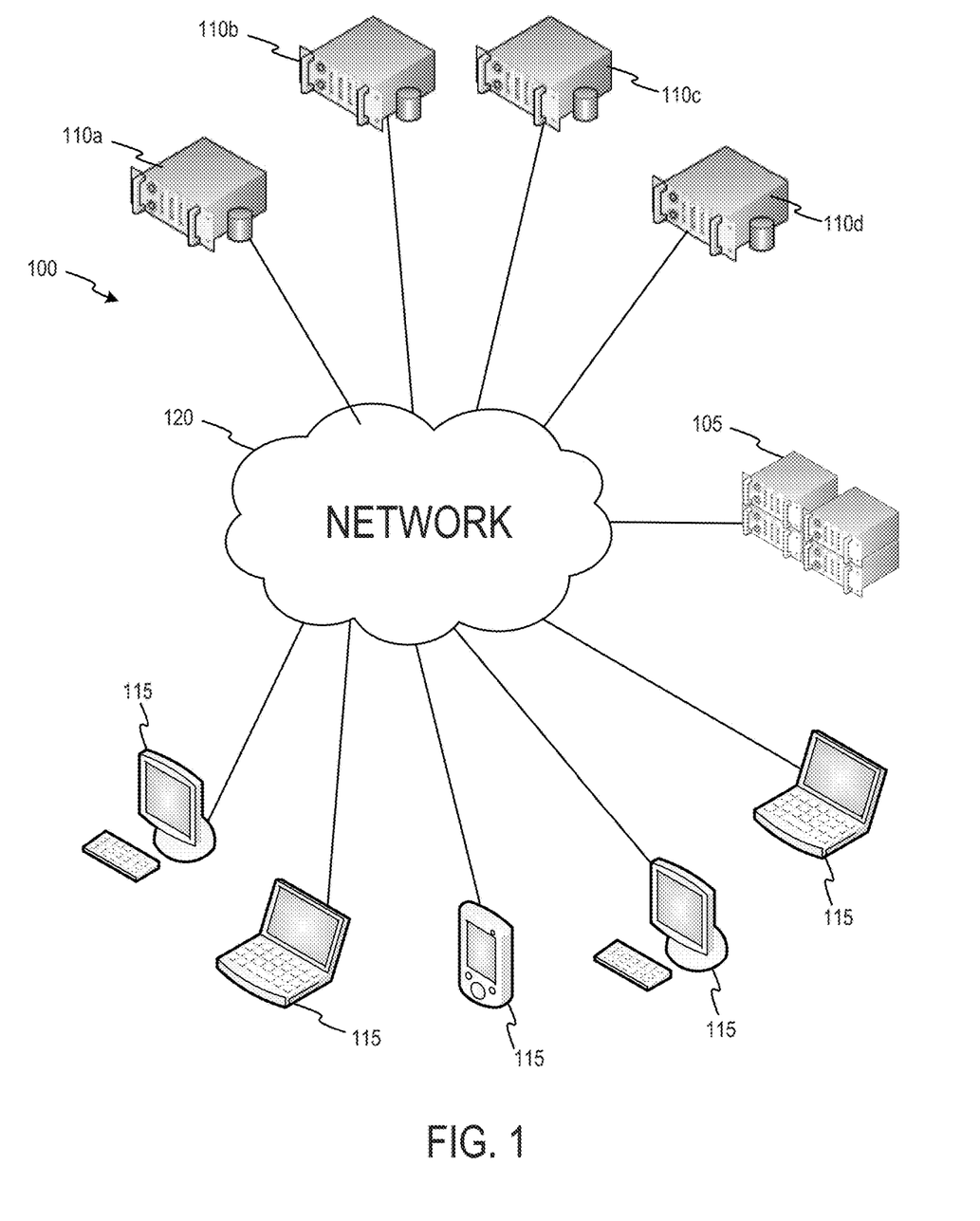
FIG. 1 depicts an illustrative diagram of a system for providing social networking-integrated shopping according to an embodiment.

FIG. 1 depicts an illustrative system, generally designated 100, for providing a shopping cart link in a social networking post according to an embodiment. Various references to the system 100 herein may be to the system as a whole, or one or more of its constituent parts. The system 100 may generally be a plurality of devices that are interconnected via a network 120, such as the Internet or one or more direct connections. In various embodiments, at least one computing device 105 may provide an interface for one or more users. The computing device 105 may contain one or more back end modules, as described in greater detail herein.

The one or more users may connect to the computing device 105 via an electronic device 115. The electronic device 115 may generally be a user's personal electronic device, such as a smartphone, a tablet, a computer, and/or the like. The electronic device 115 may contain one or more applications ("apps") that are used to provide content, connect to the computing device 105, connect to a social networking interface, and/or connect to one or more server devices 110a-110d (collectively, 110). Illustrative apps may include, for example, a web browser interface, a browser plugin, a software application, and/or the like. At least a portion of the computing device 105 and/or the electronic device 115 may host a front end module that interacts with each user via the one or more apps.

Each server device 110 may generally be a device that is owned, controlled, directed, and/or operated by a merchant, a content provider, a social networking provider, a content aggregator, a unified shopping cart provider, and/or the like. For example, a server device 110 may be a computer server that hosts a social networking provider's website, a server that hosts a content provider's website, or a computer server that hosts a merchant's website. The server device 110 may include an intelligence module that may work in conjunction with the computing device 105 to obtain intelligence on each user. For example, the intelligence module may monitor and/or analyze a user's behavior and/or the like. Those having ordinary skill in the art will recognize other features and aspects of the server device 110 not explicitly described herein.

In some embodiments, particularly as shown in FIG. 1, the electronic device 115 may connect to the computing device 105 through a network 120 such as the Internet. In other embodiments, the electronic device 115 may connect to the computing device 105 via a direct connection. The direct connection is not limited by this disclosure and may generally be any direct connection now known or later developed, including wired and wireless direct connections. In other embodiments, the electronic device 115 may connect to the computing device 105 via a networked connection other than the Internet.

The computing device 105 and/or the electronic device 115 may also connect to the one or more server devices 110. In some embodiments, the computing device 105 and/or the electronic device 115 may connect to the one or more server devices 110 through the network 120. In other embodiments, the computing device 105 and/or the electronic device 115 may connect to the one or more server devices 110 via one or more direct connections. In other embodiments, the computing device 105 and/or the electronic device 115 may connect to the one or more server devices 110 via a networked connection other than the Internet.

As will be described in greater detail herein, the computing device 105 may be configured to receive requests from one or more users via an electronic device 115 to place a shopping cart link in a social networking post stored at the one or more server devices 110. The computing device 105 may further be configured to create the shopping cart link, link to one or more products, unified shopping cart providers, and/or the like, and append the social networking post with the shopping cart link, which, in some embodiments, may include communicating with the one or more server devices 110 to add data, remove data, or modify data stored at the one or more server devices.

The functions of the various devices described herein with respect to FIG. 1 represent an improvement in the functionality of general computing devices known in the art, and thus teach significantly more than existing technology, by providing an ability to efficiently handle multiple streams of data from multiple users to add shopping cart links to future, current, and previous social networking posts, communicate with one or more social networking providers, communicate with one or more content providers, communicate with merchants or unified shopping cart providers, and perform complex calculations all at the same time. Such devices may include a plurality of components, such as the components described herein with respect to FIG. 7. The functions of the various devices described herein with respect to FIG. 1 may also provide entities with an ability to generate revenue streams that were previously nonexistent and would not be possible without the various computing devices, server devices, and electronic devices described herein. Such revenue streams would not be feasible without implementation of the devices described herein.

Figure 2:
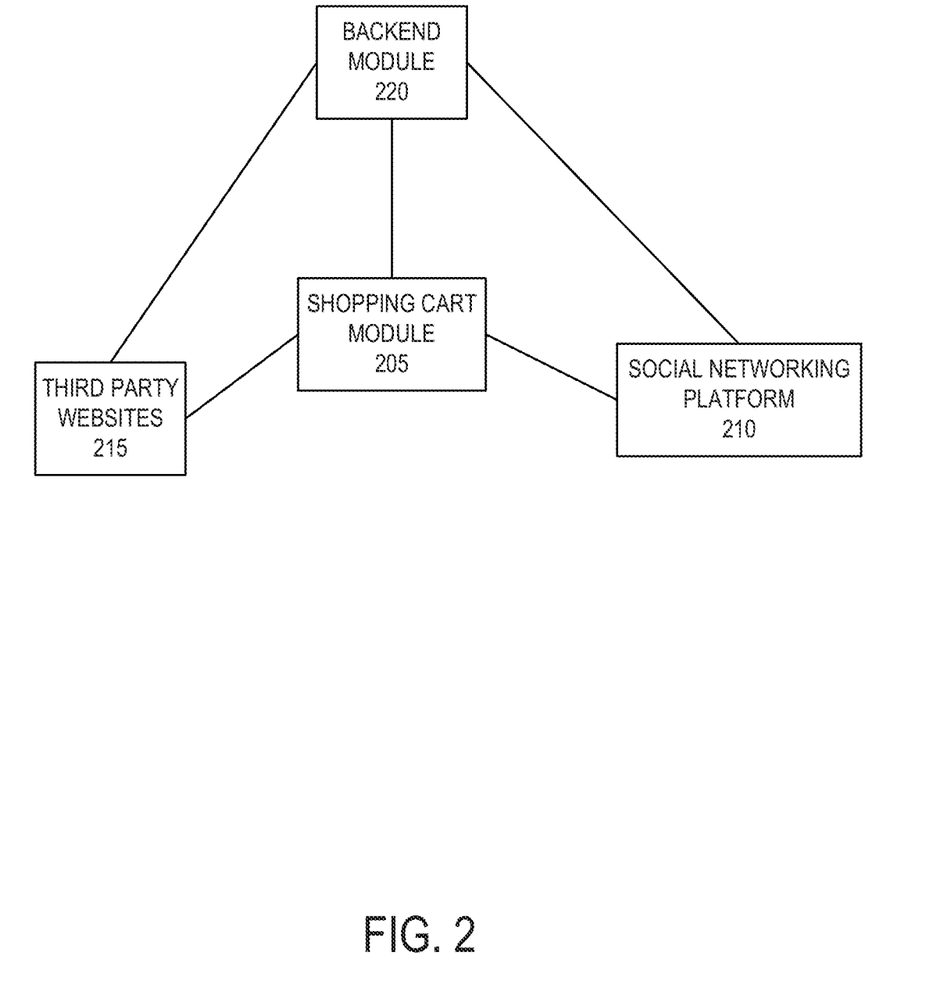
FIG. 2 depicts a schematic diagram of illustrative modules that may be implemented by one or more of the computing devices, server devices, and electronic devices described herein.

FIG. 2 depicts a schematic diagram of various modules that may be implemented by one or more of the computing devices, server devices, and electronic devices described herein. In some embodiments, a module may be implemented by one of a computing device, a server device, or an electronic device. In some embodiments, a module may be implemented by a plurality of computing devices, server devices, or electronic devices. In some embodiments, a module may be implemented by any combination of one or more computing devices, one or more server devices, and one or more electronic devices.

The modules described with respect to FIG. 2 are merely illustrative. Accordingly, additional modules, alternate modules, combined modules, or sub-modules are intended to be included herein without departing from the scope of the present disclosure. In some embodiments, fewer modules may be used, and certain modules may be omitted.

As depicted in FIG. 2, the systems and methods described herein may include, for example, one or more shopping cart modules 205, one or more social networking platform modules 210, one or more third party website modules 215, and/or one or more back end modules 220. The shopping cart module 205 may generally provide a user with an ability to shop at one or more merchants, as described in greater detail herein. Thus, the shopping cart module 205 may provide one or more shopping cart links to a social media post, may provide access to a merchant website when a shopping cart link is accessed, may provide access to a unified shopping cart, such as a unified shopping cart for a plurality of merchants, and/or the like. In some embodiments, the shopping cart module 205 may provide the same shopping cart link in a plurality of different social networking platforms (for example, the same link may be posted in both Facebook® and Twitter® posts) In some embodiments, a front end portion of the shopping cart module 205 may be accessed by one or more users via a user interface. In some embodiments, a back end portion of the shopping cart module 205 may be accessed by one or more merchants, content providers, social media providers, and/or the like. In some embodiments, advertisers may have limited access to the shopping cart module 205 to provide commentary and/or the like. An example of a shopping cart module as well as the other modules described herein, can be found in U.S. patent application Ser. No. 13/436,783 filed Mar. 30, 2012 and entitled "System and Method for Consumer Management Purchasing and Account Information," the content of which is hereby incorporated by reference in its entirety.

Figure 8:
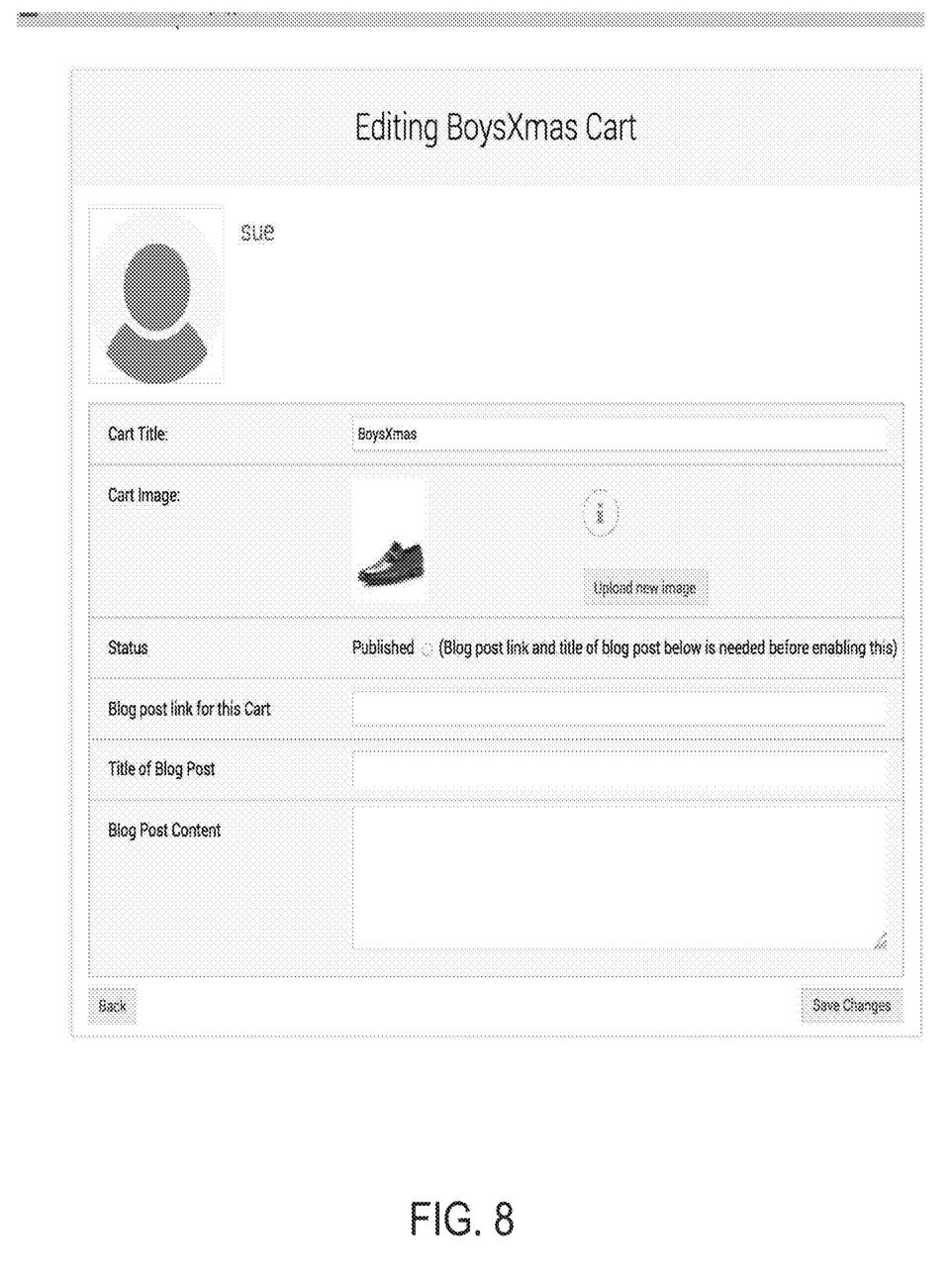
FIG. 8 depicts an illustrative dashboard-type dedicated web page according to an embodiment.

The social networking platform module 210 may generally provide a social networking platform. The social networking platform may be any system or method that interfaces with a plurality of users, thereby allowing interaction between users, and is not otherwise limited by this disclosure. In some embodiments, the social networking platform may allow a user to provide a post. Those having ordinary skill in the art will recognize that a post on a social networking platform can mean any form of communication within the social networking platform. In some embodiments, a post may include text. In some embodiments, a post may include media such as photos, video, audio, links to websites, links to particular items or services, emoticons, documents, and/or the like. In some embodiments, a post may refer to various users' ability to "like" a post, comment on a post, link to a post, add a post, delete a post, and/or the like. Furthermore, the social networking platform module 210 may interact with the shopping cart module 205 to provide a shopping cart link in a social networking post, as described in greater detail herein. Thus, for example, the social networking platform module 210 may allow a shopping cart to be installed behind a post by a creator of a post or an advertiser. In some embodiments, the social networking platform module 210 may provide a dedicated web page for advertisers, content providers, and/or the like to associate their shopping carts and corresponding content advertisements without using a comments interface, as described in greater detail herein. An illustrative dashboard-type dedicated web page is shown with respect to FIG. 8. Those having ordinary skill in the art will recognize other dashboard-type dedicated web pages that may also be used without departing from the scope of the present disclosure.

The third party website module 215 may generally provide a connection between third party websites, the social networking platform module 210, the shopping cart module 205, and the back end module 220. Such a connection may allow for a shopping cart link to products located on third party merchants' sites to be added to a social networking post, as described in greater detail herein.

The back end module 220 may generally be configured to provide back end management of shopping cart links, social networking posts, and/or the like. For example, the back end module 220 may be configured to ensure that a shopping cart link is placed on the appropriate social networking post, that it adequately links to a unified shopping cart or a merchant's website, and/or the like. In some embodiments, the back end module 220 may collect information regarding use of social networking posts and clicks on a shopping cart link, as described in greater detail herein. Accordingly, the back end module 220 may also provide analytical data regarding the collected information. Thus, in some embodiments, the back end module 220 may determine and/or provide pricing information for attaching a link to a particular social networking post, provide referral revenue generated by posted shopping cart links, and/or the like.

Figure 3:
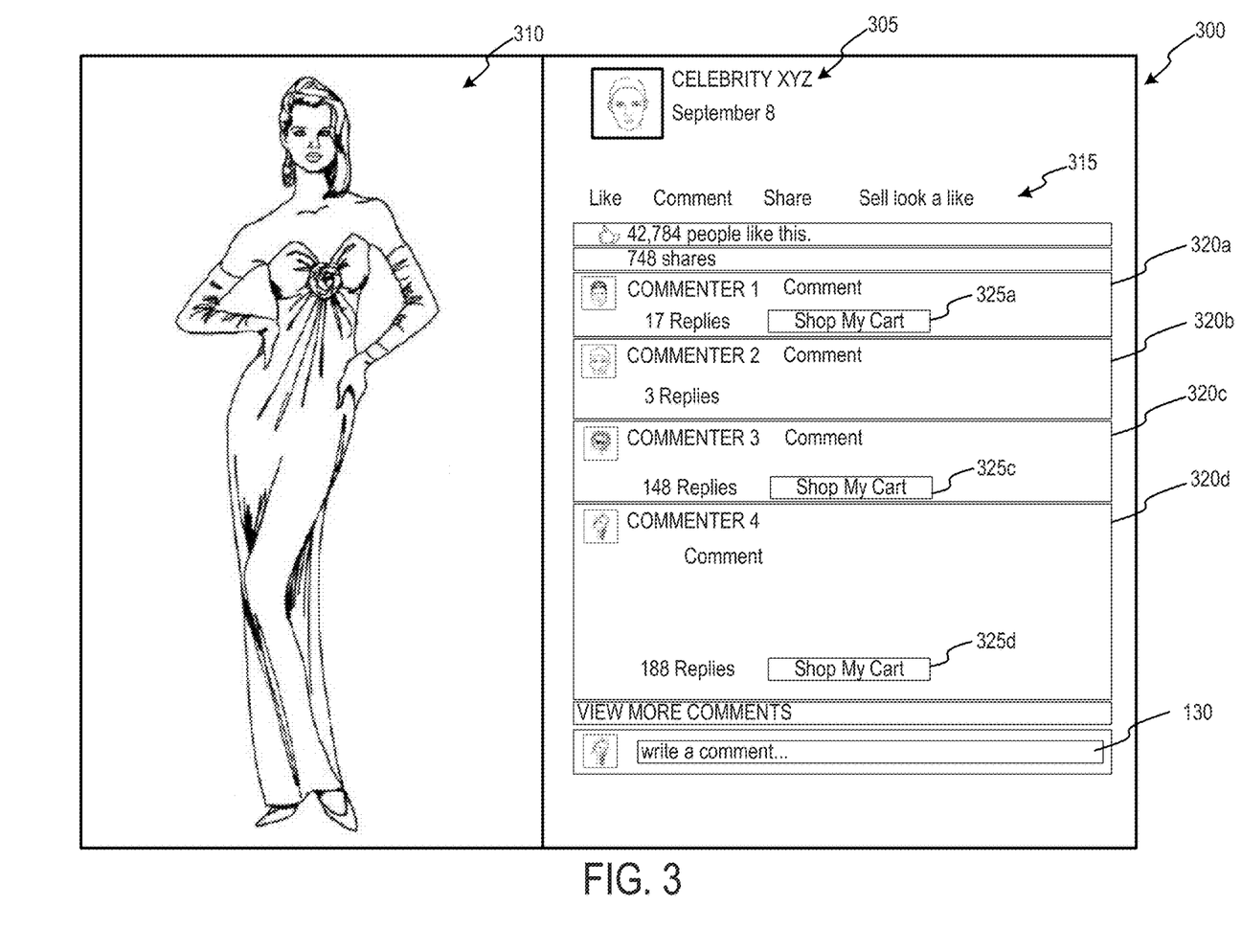
FIG. 3 depicts an illustrative social networking post according to an embodiment.

FIG. 3 depicts an illustrative social networking post, generally designated 300, according to an embodiment. The social networking post 300 depicted in FIG. 3 is merely an example and those having ordinary skill in the art will recognize other configurations, posts, and/or the like that may be used for the same purpose without departing from the scope of the present disclosure.

The social networking post 300 may generally provide a means for at least one user of a social networking platform to communicate. Thus, the social networking post 300 may include elements such as an identification 305 of the at least one user providing the post and post content 310. The post content 310 is not limited by this disclosure, and may generally be any type of content. For example, the post content 310 may be text, photos, video, audio, a document, and/or the like. In some embodiments, the post content 310 may contain or reference a product that can be purchased. For example, if the post content 310 is a photograph of a supermodel wearing a dress, the dress may be a product that can be purchased from one or more merchants' websites. In addition, the dress worn by the supermodel may be indicative of a particular style that is in season, thereby providing viewers of the post 300 an idea for similar styles and designs, as described in greater detail herein.

After a post 300 is provided, various users may be provided with actionable options 315, 130 for the post, such as, for example, liking the post, commenting on the post, sharing the post, selling look-a-like items that are similar to the products referenced in the content 310, and/or the like. If a user chooses to post a comment, a comment box 320 may appear in the post 300 or be appended to the post. In some embodiments, the comment box 320 may include a link 325 to a user's suggested items for purchase, as described in greater detail herein. The user may be required to sign up for such a link 325 before he/she is able to place the link in the comment box 320 when commenting, as described in greater detail herein. In some embodiments, the user may customize a shopping cart that contains products similar to the products referenced in the post 300 such that when another user clicks on the link 325, he/she is transported to the customized shopping cart. In some embodiments, other users may be able to reply directly to a comment box 320, as indicated in FIG. 3 (e.g., Commenter 1 has had 17 other users reply).

Figure 4A:
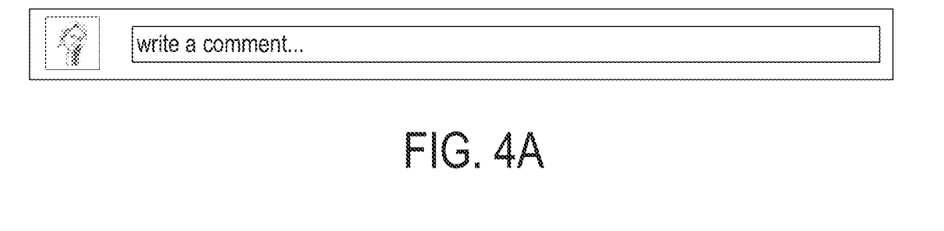
FIG. 4A, FIG. 4B and FIG. 4C depict illustrative graphical depictions of the commenting process according to an embodiment.
Figure 4B:
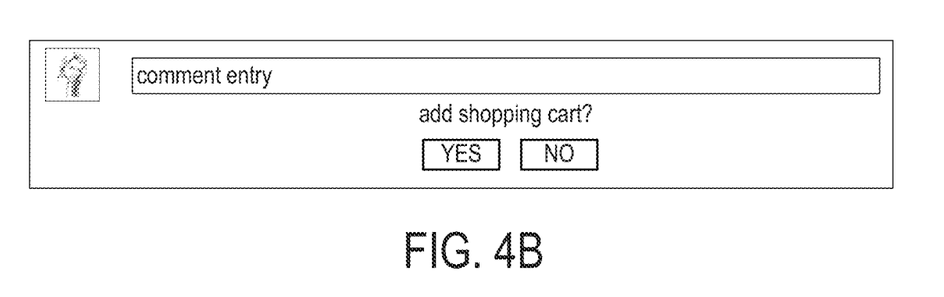
Figure 4C:
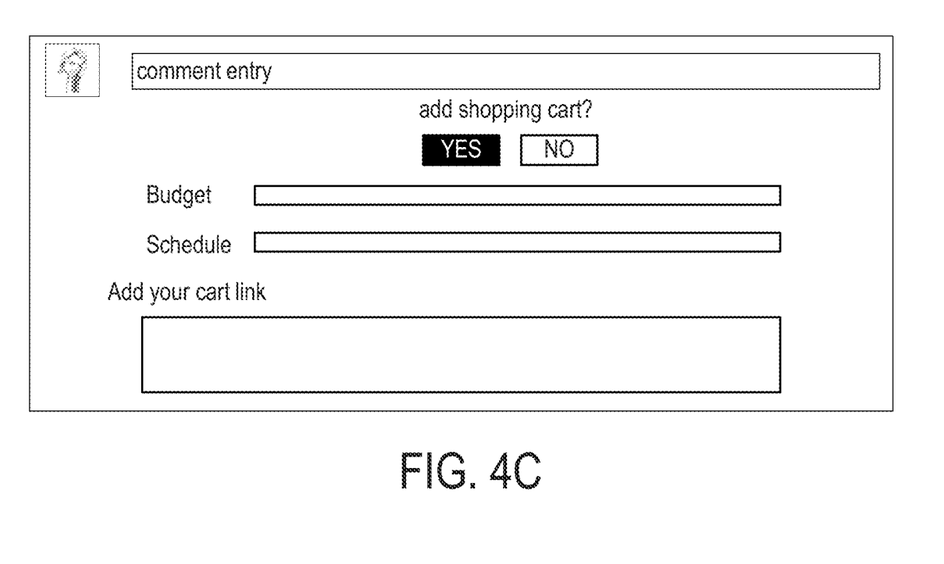

FIGS. 4A-4C depict illustrative graphical depictions of the commenting process according to an embodiment. As shown in FIG. 4A, a user is provided with an option to write a comment. Upon clicking a button or clicking in a comment box, the user may type a comment entry and may be prompted with a query as to whether he/she would like to add a shopping cart, as shown in FIG. 4B. In some embodiments, if a user affirmatively answers the query, the user may be provided with one or more data entry fields, such as a budget, a schedule, uniform resource locator (URL) entry for a shopping cart link, an option to create a shopping cart, an option to bid on the post content, and/or the like, as shown in FIG. 4C. Details of such data entry fields are described in greater detail herein.

Figure 5:
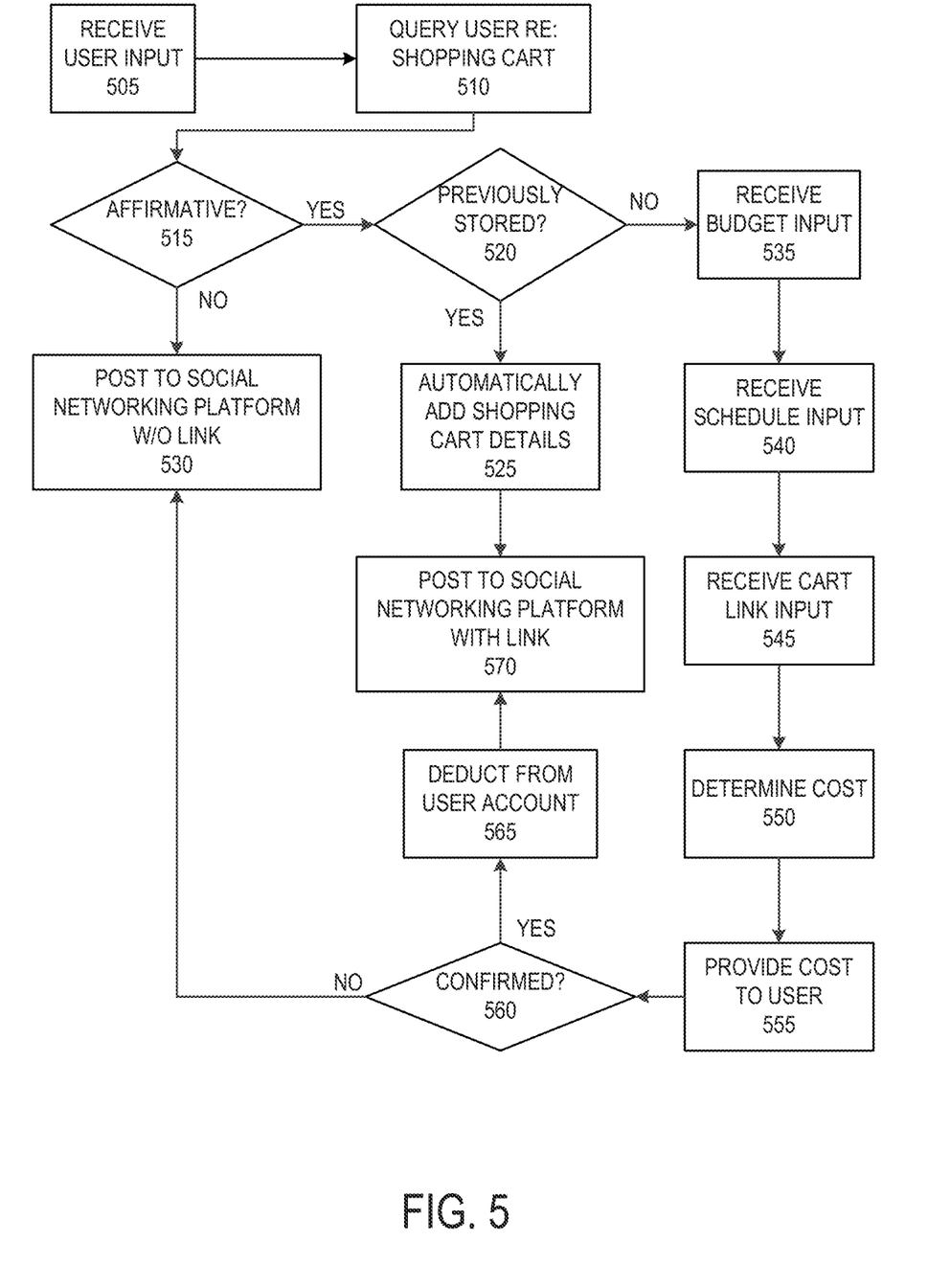
FIG. 5 depicts a flow diagram of an illustrative method for providing a shopping cart link in a new or future social networking post according to an embodiment.

FIG. 5 depicts a flow diagram of an illustrative method for providing a shopping cart link in a new or future social networking post according to an embodiment. The method may generally be completed by a computing device that is adapted to obtain information from a plurality of sources at substantially the same time, perform calculations based upon the inputs, and post information to a social networking platform based on the inputs and the calculations. In some embodiments, the computing device may be particularly configured to complete the calculations and receive the inputs in a minimal amount of time. Accordingly, in some embodiments, a specialized computing device may be necessary to complete the operations, as a general purpose computer may not be able to handle such operations substantially simultaneously. References to the "system" as described with respect to FIGS. 5 and 6 include such a specialized computing device.

In various embodiments, the system may receive 505 an input from a user. The input is not limited by this disclosure, but may generally be indicative that the user wishes to create a post to a social networking platform, edit a post, comment on a post, like a post, and/or the like. Thus, in some embodiments, the input may include a user click in a text entry box for creating a post or commenting on a post, as described herein. Such an input may come directly from a user via a user interface or may come from an automated system working on behalf of the user. The system may query 510 the user as to whether he/she would like to place a shopping cart link inside the post, the comment, and/or the like. The system may determine 515 whether the user answers in the affirmative, such as, for example, by clicking a "yes" or a "no" button. If the user does not provide an affirmative response, the system may post 530 to the social networking platform without a link to a shopping cart. If the user provides an affirmative response, the system may determine 520 whether information regarding a shopping cart link has previously been stored. For example, information regarding a shopping cart link may be previously stored if a user has previously posted a link to a social networking platform, if a user has previously registered and/or set up a shopping cart link, if a user has indicated that a shopping cart link should always be posted as a default, and/or the like. If the shopping cart link has previously been stored, the system may automatically add 525 shopping cart details to the post and post 570 to the social networking platform with a link to the previously stored shopping cart. In addition, the user may automatically be charged for any fees associated with posting the link.

If a shopping cart link has not been previously stored, the system may receive 535 a budget input. In some embodiments, the budget input may be received 535 from the user. The budget input may generally correspond to an amount the user is willing to pay to have the shopping cart link added to his/her post, comment, and/or the like. Such a budget input is received 535 to ensure that a user is not overcharged or unfairly charged for the shopping cart link.

In addition to the budget input, the system may receive 540 a schedule input. In some embodiments, the schedule input may be received 540 from the user. The schedule input may generally correspond to a scheduling of the shopping cart link. More particularly, the schedule input may correspond to an amount of time the user wishes the shopping cart link to be present in the post before being removed from the post. In some embodiments, the schedule input may specify particular days and times at which the shopping cart link appears with the post. In some embodiments, the schedule input may specify particular users or groups of users to whom the shopping cart link is visible, as well as particular users or groups of users to whom the shopping cart link is not visible. In some embodiments, the schedule input may specify particular products to be included at particular times of the day. For example, a particular product may sell better during typical business hours (9 AM to 5 PM), whereas another product may sell better in the evening hours (5 PM-8 PM). Thus, a user may wish to specify a particular schedule that maximizes sales for those particular times.

In addition to the budget input and the schedule input, the system may also receive 545 a cart link input. In some embodiments, the cart link input may be received 545 directly from the user. In other embodiments, the cart link input may be received 545 from the user via a copied and pasted URL obtained from a third party merchant or a unified shopping cart provider. In other embodiments, the cart link input may be received 545 directly from a third party merchant or a unified shopping cart provider. In such embodiments, the system may query the third party merchant or the unified shopping cart provider to obtain the cart link input. The cart link input may be generated to correspond to a particular collection or products, a link to a merchant's website, or a link to a uniform shopping cart.

In some embodiments, the system may also receive one or more other inputs. In some embodiments, the one or more other inputs may be received from the user. The one or more other inputs may contain various parameters for providing advertising. Illustrative parameters may include, for example, location-based advertising and/or the like. For example, the cart link may vary based on the location of a user viewing a post containing the link. Thus, a user in Boston may see different items in a cart when clicking on a link than a user in San Francisco when clicking on the same link at substantially the same time.

In various embodiments, the system may determine 550 a cost for providing the shopping cart link. In some embodiments, the cost may be based on the budget and/or the schedule. In some embodiments, other factors may contribute to the cost, such as, for example, a fee charged by the social networking provider, a fee charged by a content provider, a fee charged by a unified shopping cart provider, referral fees, hosting fees, preset fees, and/or the like. In some embodiments, the cost may be based on a particular time the shopping cart link is provided. For example, the cost may be elevated during peak periods and decreased during off-peak periods. In some embodiments, the determined cost may be provided 555 to the user to allow the user to confirm or accept the cost. The system may determine 560 whether the user has confirmed the cost, which may be completed, for example, by receiving an input from the user confirming or rejecting the cost, receiving payment from the user for the cost, and/or the like. In some embodiments, inaction by a user after an elapsed period of time may be indicative of a rejection of the cost. If a user does not confirm the cost, the post may be posted 530 to the social networking platform without the unified shopping cart link. If a user confirms the cost, the cost may be deducted 565 from a user account. The manner in which the deduction 565 is performed is not limited by this disclosure and may include invoicing the user, initiating a transfer from a financial account, charging a financial account, receiving a check or cash from a user, redeeming points, redeeming credits, initiating a transfer of virtual money, and/or the like. The post may be posted 570 to the social networking platform with the link in accordance with the schedule and budget specified by the user.

Figure 6:
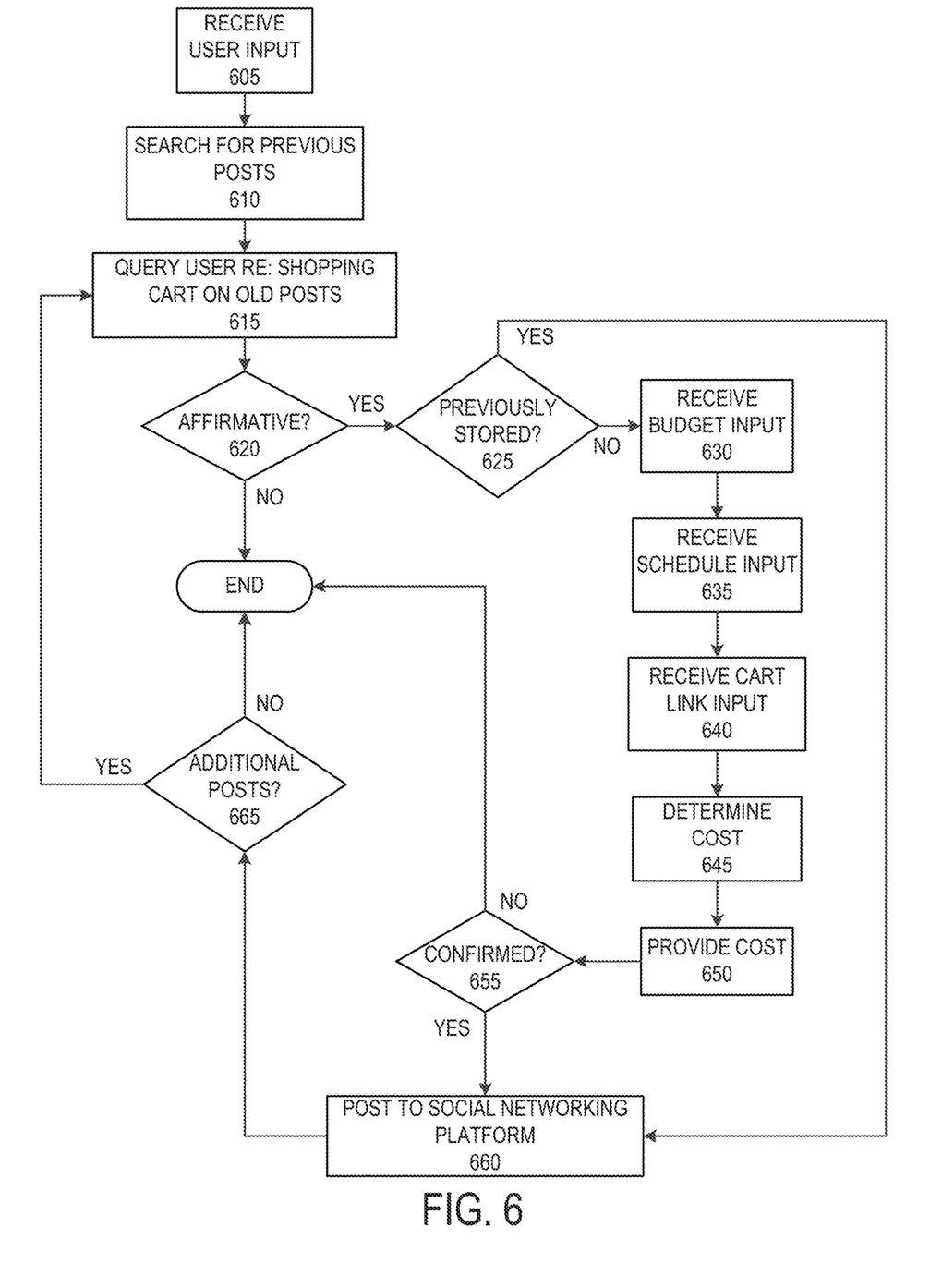
FIG. 6 depicts a flow diagram of an illustrative method for providing a shopping cart link in a previous social networking post according to an embodiment.

FIG. 6 depicts a flow diagram of an illustrative method for providing a shopping cart link in a previous social networking post according to an embodiment. A previous social networking post may generally be any post that is already present in a social networking platform. Accordingly, a previous social networking post would have to be amended to include a shopping cart link. In various embodiments, the system may receive 605 a user input. The input may generally indicate a potential desire to add a shopping cart link to previous posts. Such an input may come directly from a user via a user interface or may come from an automated system working on behalf of the user. In some embodiments, the input may be for a single post. In other embodiments, the input may be for a plurality of posts. For purposes of simplicity, the method will be described with respect to a single post, but similar principles may be applied to a plurality of posts, including batch posts. The system may search 610 for previous posts. In some embodiments, the system may search a database or the like for posts made by a particular user, a group of users, and/or the like. Once a post has been found via the search, the system may query 615 the user to determine 620 whether the user desires to add a shopping cart link to the post. If a user does not wish to add a shopping cart link to the post, the process ends.

If a user wishes to add a shopping cart link to the post, the system may determine 625 whether information regarding the link has been previously stored. Such a determination is similar to the determination 520 described herein with respect to FIG. 5. If information has been previously stored, the post may be amended to include the shopping cart link and posted 660 (or reposted) to the social networking platform.

If information has not been previously stored, the system may receive 630 a budget input, receive 635 a schedule input, receive 640 a cart link input, determine 645 a cost, provide 650 the cost to the user, and determine 655 whether the user confirms the cost. Such processes are similar to processes 535-560 described herein with respect to FIG. 5. If a user does not confirm the cost, the process may end. If a user confirms the cost, the post may be amended to include the link and may be posted 660 (or reposted) to the social networking platform. The system may additionally determine 665 whether additional previous posts exist, and if such posts do exist, may again query 615 the user as to whether the user desires to place a shopping cart link on the additional posts.

In various embodiments, the link added to a social networking post may link to a cart in a mobile application, a web application, a browser extension, a website, and/or the like. Such a link may provide a user with an ability to purchase one or more products, which, in some embodiments, may be curated or recommended by one or more entities. In some embodiments, when the link is clicked, an app or software extension may be configured to record information regarding the post associated with the link, the user that clicked the link, the user that created the post, a merchant, a unified shopping cart provider, and/or the like. Illustrative information may include, but is not limited to, a URL, metadata, identification of a merchant, identification of a publisher, identification of one or more products contained on a merchant's page or in a unified shopping cart, identification of a price for each of the one or more products, identification of previously cataloged items, identification of items located in a marketplace, and identification of other associated webpages (such as, for example, other webpages located on a website containing the webpage).

In some embodiments, the shopping cart link may provide a user access to a marketplace containing a plurality of items that are offered for sale by one or more merchants. Thus, for example, the marketplace may be an aggregation of items that are offered for sale by merchants. Such a marketplace may provide a user with an ability to quickly browse for, search, and/or discover an item. In some embodiments, the marketplace may allow for a user to copy items from a shared shopping cart to the user's own shopping cart. The marketplace may further provide the user with a list of merchants that offer the item for sale, available discounts for the item, look-a-like items, items marked for price drop notification, and/or the like, as described in greater detail herein. For users such as content providers, the marketplace may provide the user with an ability to feature an item in print, digital content, video content, and/or audio content, such as a collection and/or the like, as described herein. The marketplace may be searchable, such as by name, keyword, price, store, level of popularity among other content providers, type of collection, type of item, whether a content provider has added the item to his/her content, whether the item is popular, and/or the like. The marketplace may provide a user with an ability to search for all collections of a content provider, detailed descriptions of a content provider and other shopping carts held with the content provider, and links back to the content provider's website and/or content.

The shopping cart link described herein may provide a user with access to systems and methods that allow the user to discover, collect, aggregate, optimize, and automatically apply any coupons, rewards, gift cards, loyalty programs, and/or the like (collectively referred to as "Value Elements" or "VEs") in real time at a point of purchase without navigating away from the social networking platform. Via the VEs, the systems and methods may allow for substantial efficiencies to the online retail business by increasing value for the consumer while simultaneously reducing the cost of goods sold. The systems and methods may also allow issuance of real-time promotions for reduced accounting liabilities for merchants (for outstanding VEs) and increased promotion redemption rate and sales volume. As such, a merchant may increase profits and be better equipped to properly compensate content providers that refer one or more consumers to the merchant.

As previously described herein, if a user browsing the social networking platform desires to purchase one or more items described in a post, described in a comment, and/or contained in a shopping cart link, he/she may click on the link to view one or more products, such as, for example, a collection of products. The user may further be able to select desired products from the list and move them to his/her personal unified cart, which, in some embodiments, may be integrated in a network of shopping carts with a plurality of merchants. In some embodiments, a user may desire to save products for future purchase or to receive price drop notifications based coupons added to the system or store price dropping. The system may be configured to store the user's product selections, but not complete additional steps described below until the user decides to move forward with the purchase. Such a decision may be completed by the user by accessing a "saved items" cart and/or the like. In some embodiments, a "saved items" cart may be private and only accessible to the user. In other embodiments, a "saved items" cart may be partially private, where it is only accessible to the user and anyone designated by the user to view the cart. In other embodiments, a "saved items" cart may be public and accessible to anyone. For example, the user may create a shopping cart link for posting to the social networking platform, where the shopping cart link contains the "saved items" cart for others to view, thereby generating additional income for the various parties, as described in greater detail herein.

In various embodiments, to ensure various parties receive payment for purchases made via the shopping cart links in the social networking posts, the system may be configured to determine whether a product has been purchased. Determination may generally include communicating with one or more merchants to receive confirmation from each merchant about whether a transaction was completed. For example, in some embodiments, the system and the merchant may be members of the same affiliate marketing provider, which may allow for transmission of purchase information and issuance of referral bonuses, credits, and/or the like. In some embodiments, when a user selects a product from a collection, information about that product may be inserted into tracking records that are sent to the merchant. If the user decides not to purchase the product, but rather to save the product for future purchase (as described herein), the identification information relating to the content publisher's initial referral may be carried with the product. Eventually, when the user decides to purchase the product, the information may be inserted in a record that is sent to the merchant. The record may be allocated to the system by an affiliate network or the merchant. When the sale is consummated by the merchant, the information contained in the record is retrieved by the system, either directly from the merchant or via the affiliate network. The information may include evidence of sale consummation and attribution to the original content provider that provided the referral to the merchant even if series of other users share the shopping cart. The information may be specific to the user that provided the link in the social networking post, thereby avoiding instances where two different users provide a link to the same product. In this manner, no confusion may arise regarding which user actually provided the referral to the merchant. Similarly, when a user republishes an already published product by another user, the system may be configured to track the originating collection and attribute the referral correctly. Therefore, the system may provide an incentive to users to introduce other users to the system by correctly attributing all products sold and allocating a percentage commission of lower level users to the referring user. Crediting the referral to the user may generally include acknowledging that the user's content led to a purchase of a particular item. Thus, the user may receive compensation, an award, a change in status, virtual currency, points, and/or the like for the referral. In some embodiments, the type of credit may depend upon the affiliate marketing provider, the merchant, various agreements between the merchant, the affiliate marketing provider, shopping cart provider and the user, and/or the like.

In some embodiments, the systems and methods described herein may obtain information by observing, obtaining, and/or recording user interactions within the social networking platform. For example, the systems and methods described herein may record a popularity of an item, a social networking post, and/or the like. The popularity may be based upon, for example, the number of users that access a shopping cart link in a post, the number of users that view a post, the number of users that "like" a post, the number of users that respond to a post, the number of users that reshare or repost a post, and/or the like. The obtained information for such interactions may be used to determine an amount to be charged for adding a shopping cart link to a post, an amount to be charged for adding a shopping cart link to similar posts, an amount of time a shopping cart link may be available to users who view a post, a referral amount to be paid to a user that provides a shopping cart link in a post, and/or the like, as described in greater detail herein. Those with ordinary skill in the art will recognize additional observations that are not explicitly described herein. This disclosure is meant to include such observations. In some embodiments, the systems and methods described herein may be configured to provide a searchable database containing the observations and/or any information obtained therefrom.

Figure 7:
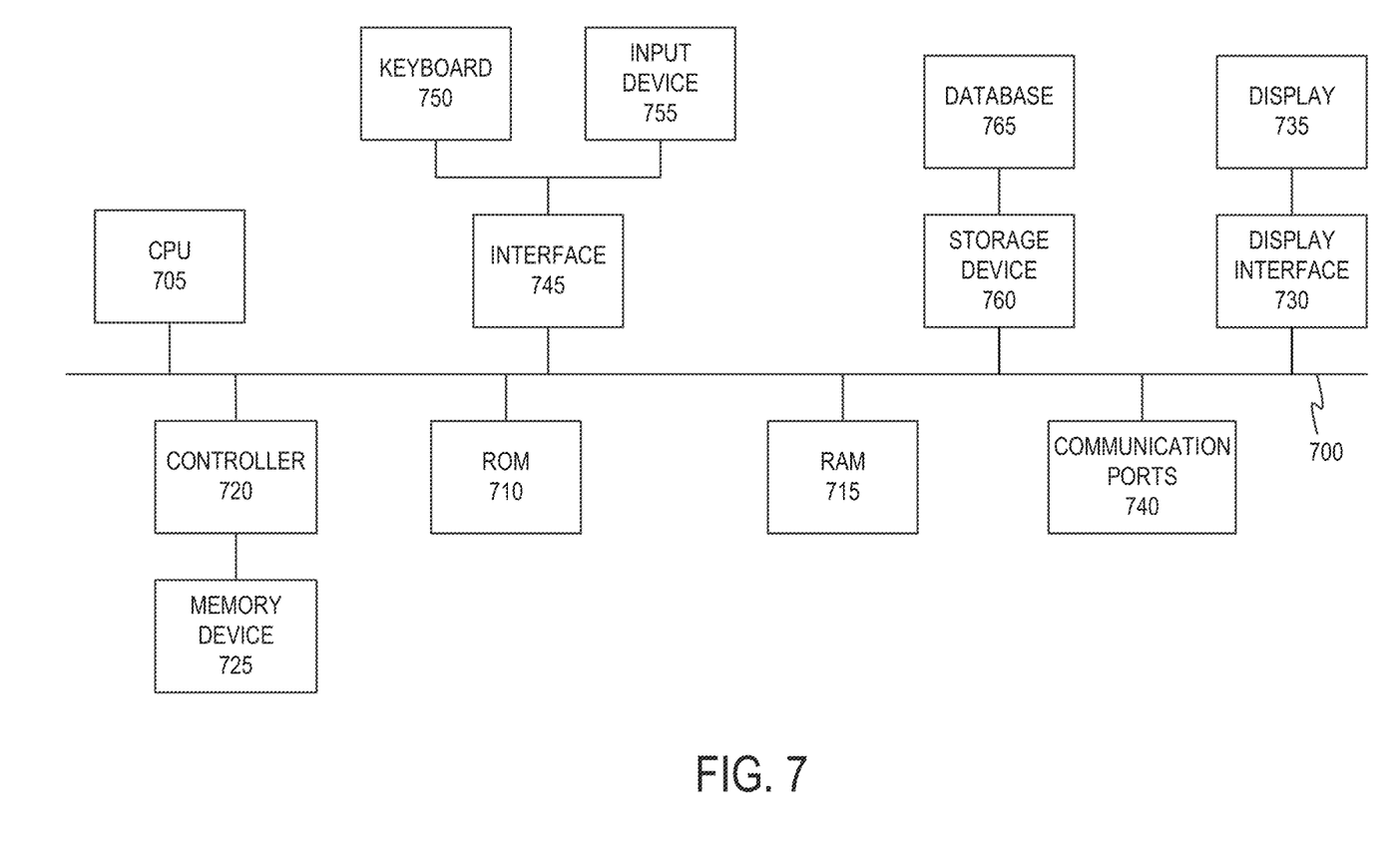
FIG. 7 depicts a block diagram of illustrative internal hardware that may be used to contain or implement program instructions, such as the process steps discussed herein, according to various embodiments.

FIG. 7 depicts a block diagram of illustrative internal hardware that may be used to contain or implement program instructions, such as the process steps discussed herein, according to various embodiments. A bus 700 may serve as the main information highway interconnecting the other illustrated components of the hardware. A CPU 705 is the central processing unit of the system, performing calculations and logic operations required to execute a program. The CPU 705, alone or in conjunction with one or more of the other elements disclosed in FIG. 7, is an illustrative processing device, computing device or processor as such terms are used within this disclosure. Read only memory (ROM) 710 and random access memory (RAM) 715 constitute illustrative memory devices (such as, for example, processor-readable non-transitory storage media).

A controller 720 interfaces with one or more optional memory devices 725 to the system bus 700. These memory devices 725 may include, for example, an external or internal DVD drive, a CD ROM drive, a hard drive, flash memory, a USB drive, or the like. As indicated previously, these various drives and controllers are optional devices.

Program instructions, software, or interactive modules for providing the interface and performing any querying or analysis associated with one or more data sets may be stored in the ROM 710 and/or the RAM 715. Optionally, the program instructions may be stored on a tangible computer-readable medium such as a compact disk, a digital disk, flash memory, a memory card, a USB drive, an optical disc storage medium, such as a Blu-ray™ disc, and/or other non-transitory storage media.

An optional display interface 730 may permit information from the bus 700 to be displayed on the display 735 in audio, visual, graphic, or alphanumeric format, such as the interface previously described herein. Communication with external devices, such as a print device, may occur using various communication ports 740. An illustrative communication port 740 may be attached to a communications network, such as the Internet, an intranet, or the like.

The hardware may also include an interface 745 which allows for receipt of data from input devices such as a keyboard 750 or other input device 755 such as a mouse, a joystick, a touch screen, a remote control, a pointing device, a video input device and/or an audio input device.

The hardware may also include a storage device 760 such as, for example, a connected storage device, a server, and an offsite remote storage device. Illustrative offsite remote storage devices may include hard disk drives, optical drives, tape drives, cloud storage drives, and/or the like. The storage device 760 may be configured to store data as described herein, which may optionally be stored on a database 765. The database 765 may be configured to store information in such a manner that it can be indexed and searched, as described herein.

The computing device of FIG. 7 and/or components thereof may be used to carry out the various processes as described herein.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for incorporating a shopping cart link into a social networking post, the system comprising:
    a processing device;
    a touch screen;
    wireless network adapter; and
    a non-transitory, processor-readable storage medium, wherein the non-transitory, processor-readable storage medium comprises one or more programming instructions that, when executed, cause the processing device to:
    receive, using the touch screen, at least one touch input indicating a user request to add the shopping cart link to a social networking post associated with a user making the user request,
    the social networking post to be posted to one or more social networks, wherein the shopping cart link comprises a network address of a unified shopping cart associated with the user,
    the unified shopping cart comprising a plurality of recommended products available for purchase from a plurality of merchants, each merchant having a separate merchant website offering for sale at least one of the plurality of products, wherein the plurality of recommended products are selected for purchase by the user from multiple merchants and placed into the unified shopping cart by the user, wherein the user is not a merchant;
    transmit, using the wireless network adapter, the shopping cart link to at least one server associated with the social networking post; and
    store a tracking record containing a plurality of information associated with the social networking post, whereby the system retrieves the tracking record to attribute referrals of the social network post correctly;
    further comprising one or more programming instructions that, when executed, cause the processing device to receive a budget input, wherein the budget input corresponds to a desired amount a user wishes to pay to have the shopping cart link placed in the social networking post;
    wherein the determined cost comprises at least one of an amount paid to a social networking platform provider for allowing the shopping cart link and an amount paid to a unified shopping cart provider for providing access to a unified shopping cart containing one or more products that are available for purchase from one or more merchants;
    wherein at least a portion of the determined cost is based upon a schedule of time the shopping cart link is to be included within the social networking post.

2. A method for incorporating a shopping cart link into a social networking post, the method comprising:
    receiving, at a processing device via a touch screen, at least one touch, input indicating a user request to add the shopping cart link to a social networking post associated with a user making the user request,
    the social networking post to be posted to one or more social networks, wherein the shopping cart link comprises a network address of a unified shopping cart associated with the user,
    the unified shopping cart comprising a plurality of recommended products available for purchase from a plurality of merchants, each merchant having a separate merchant website offering for sale at least one of the plurality of products, wherein the plurality of recommended products are selected for purchase by the user from multiple merchants and placed into the unified shopping cart by the user, wherein the user is not a merchant;

transmitting, using a wireless network adapter, the shopping cart link to at least one server associated with the social networking post; and store a tracking record containing a plurality of information associated with the social networking post, whereby the system retrieves the tracking record to attribute referrals of the social network post correctly;

further comprising:

determining, by the processing device, a cost for placing the shopping cart link in the social networking post;

providing, by the processing device, the determined cost to the user; and receiving, by the processing device, confirmation from the user to add the shopping cart link to the social networking post;

wherein the determined cost comprises at least one of an amount paid to a social networking platform provider for allowing the shopping cart link and an amount paid to a unified shopping cart provider for providing access to a unified shopping cart containing one or more products that are available for purchase from one or more merchants;

wherein at least a portion of the determined cost is based upon a schedule of time the shopping cart link is to be included within the social networking post.

* * * * *